United States Patent
Fjellstad et al.

(10) Patent No.: US 10,839,181 B1
(45) Date of Patent: Nov. 17, 2020

(54) METHOD TO SYNCHRONIZE A BARCODE DECODE WITH A VIDEO CAMERA TO IMPROVE ACCURACY OF RETAIL POS LOSS PREVENTION

(71) Applicant: ZEBRA TECHNOLOGIES CORPORATION, Lincolnshire, IL (US)

(72) Inventors: Christopher J. Fjellstad, Smithtown, NY (US); Abhilash Gururaja, Levittown, NY (US); Sajan Wilfred, Kollam (IN); Vincent J. Daempfle, Plainview, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/736,632

(22) Filed: Jan. 7, 2020

(51) Int. Cl.
*G06K 7/10* (2006.01)
*G06Q 10/08* (2012.01)
*G06T 7/246* (2017.01)

(52) U.S. Cl.
CPC ....... *G06K 7/10861* (2013.01); *G06Q 10/087* (2013.01); *G06T 7/246* (2017.01); *G06T 2207/10016* (2013.01)

(58) Field of Classification Search
CPC ... G06K 7/10861; G06T 7/246; G06Q 10/087
USPC .................................. 235/492, 383
See application file for complete search history.

(56) References Cited

U.S. PATENT DOCUMENTS

| | | |
|---|---|---|
| 5,594,228 A | 1/1997 | Swartz et al. |
| 5,747,784 A | 5/1998 | Walter et al. |
| 6,236,736 B1 | 5/2001 | Crabtree et al. |
| 6,538,623 B1 | 3/2003 | Martin |
| 6,903,681 B2 | 6/2005 | Faris et al. |
| 7,284,699 B2 | 10/2007 | Hamilton |
| 7,305,691 B2 | 12/2007 | Cristofalo |
| 7,389,921 B2 | 6/2008 | Lin et al. |
| 7,845,553 B2 | 12/2010 | Holz et al. |
| 8,046,312 B2 | 10/2011 | Marchildon et al. |
| 8,103,501 B2 | 1/2012 | Mumm et al. |
| 8,162,214 B1 | 4/2012 | Malatesta et al. |
| 8,280,631 B2 | 10/2012 | Nielsen et al. |
| 8,313,032 B2 | 11/2012 | Fjellstad et al. |
| 8,403,215 B2 | 3/2013 | Aihara et al. |
| 8,421,604 B2 | 4/2013 | Bellows et al. |
| 8,447,111 B2 | 5/2013 | King et al. |
| 8,520,888 B2 | 8/2013 | Spitzig et al. |
| 8,531,295 B2 | 9/2013 | Manske |
| 8,619,147 B2 | 12/2013 | King et al. |
| 8,651,380 B2 | 2/2014 | Baumert |

(Continued)

*Primary Examiner* — Daniel A Hess
(74) *Attorney, Agent, or Firm* — Yuri Astvatsaturov

(57) ABSTRACT

Systems and methods for synchronizing a barcode decode with a video camera to improve accuracy of retail POS loss prevention are disclosed herein. An example system includes a video camera configured to capture a set of frames associated with a target object, the set of frames having a first number of frames; a symbology reader configured to: (i) decode a symbology attached to the target object and (ii) generate a signal based on the successful decoding of the symbology attached to the target object; and a processor configured to analyze a sub-set of the set of frames based on the signal, the sub-set of the set of frames having a second number of frames that is smaller than the first number of frames.

6 Claims, 4 Drawing Sheets

(56) References Cited

U.S. PATENT DOCUMENTS

| | | |
|---|---|---|
| 8,794,506 B2 | 8/2014 | Hvidtfeldt |
| 8,811,959 B2 | 8/2014 | Conner et al. |
| 8,874,504 B2 | 10/2014 | King et al. |
| 8,898,558 B2 | 11/2014 | Jain et al. |
| 8,988,251 B2 | 3/2015 | Clements |
| 9,020,634 B2 | 4/2015 | Bailey et al. |
| 9,116,890 B2 | 8/2015 | King et al. |
| 9,125,014 B2 | 9/2015 | Block et al. |
| 9,143,638 B2 | 9/2015 | King et al. |
| 9,152,828 B2 * | 10/2015 | Goncalves ......... G06K 9/00771 |
| 9,292,895 B2 | 3/2016 | Rodriguez et al. |
| 9,319,555 B2 | 4/2016 | King et al. |
| 9,418,252 B2 | 8/2016 | Nahill et al. |
| 9,460,948 B2 | 10/2016 | Suorsa et al. |
| 9,542,597 B2 | 1/2017 | Chung et al. |
| 9,648,197 B2 | 5/2017 | Aller |
| 9,799,060 B2 | 10/2017 | King et al. |
| 9,886,845 B2 | 2/2018 | Rhoads et al. |
| 9,959,391 B2 | 5/2018 | Saint et al. |
| 9,998,220 B2 | 6/2018 | Aoyama et al. |
| 10,007,826 B2 | 6/2018 | Ebrahimi et al. |
| 10,042,078 B2 | 8/2018 | Sarraiocco |
| 10,249,160 B2 | 4/2019 | Pang et al. |
| 10,289,989 B2 | 5/2019 | Kelly |
| 10,304,147 B2 | 5/2019 | Kelly |
| 10,373,276 B2 | 8/2019 | Carpenter et al. |
| 10,380,814 B1 | 8/2019 | Mathiesen et al. |
| 10,423,862 B2 | 9/2019 | King et al. |
| 10,445,593 B1 | 10/2019 | Mathiesen et al. |
| 2002/0008621 A1 | 1/2002 | Barritz et al. |
| 2002/0047867 A1 | 4/2002 | Mault et al. |
| 2002/0158765 A1 | 10/2002 | Pape et al. |
| 2004/0099736 A1 | 5/2004 | Neumark |
| 2005/0125366 A1 | 6/2005 | Obrea et al. |
| 2005/0197929 A1 | 9/2005 | Lucas |
| 2005/0223322 A1 | 10/2005 | Graham et al. |
| 2005/0229092 A1 | 10/2005 | Hull et al. |
| 2006/0081714 A1 | 4/2006 | King et al. |
| 2006/0119900 A1 | 6/2006 | King et al. |
| 2006/0136629 A1 | 6/2006 | King et al. |
| 2006/0145837 A1 | 7/2006 | Horton et al. |
| 2006/0187048 A1 | 8/2006 | Curkendall et al. |
| 2006/0253346 A1 | 11/2006 | Gomez |
| 2007/0058040 A1 | 3/2007 | Zhang et al. |
| 2008/0116271 A1 | 5/2008 | Holz et al. |
| 2008/0189170 A1 | 8/2008 | Ramachandra |
| 2008/0191013 A1 | 8/2008 | Liberatore |
| 2009/0001166 A1 | 1/2009 | Barkan et al. |
| 2009/0008450 A1 | 1/2009 | Ebert et al. |
| 2009/0134221 A1 | 5/2009 | Zhu et al. |
| 2010/0053329 A1 | 3/2010 | Flickner et al. |
| 2010/0059589 A1 | 3/2010 | Goncalves et al. |
| 2011/0034176 A1 | 2/2011 | Lord et al. |
| 2011/0075228 A1 | 3/2011 | King et al. |
| 2011/0228974 A1 | 9/2011 | King |
| 2011/0246333 A9 | 10/2011 | King et al. |
| 2011/0281630 A1 | 11/2011 | Omar |
| 2012/0016831 A1 | 1/2012 | Coradi |
| 2012/0022902 A1 | 1/2012 | Gressel et al. |
| 2012/0134548 A1 | 5/2012 | Rhoads et al. |
| 2012/0295240 A1 | 11/2012 | Walker |
| 2013/0018741 A1 | 1/2013 | Ostrowski et al. |
| 2013/0046153 A1 | 2/2013 | Hyde et al. |
| 2013/0166332 A1 | 6/2013 | Hammad |
| 2013/0212420 A1 | 8/2013 | Lawson et al. |
| 2013/0229396 A1 | 9/2013 | Huebner |
| 2013/0346261 A1 | 12/2013 | Phillips et al. |
| 2014/0023264 A1 | 1/2014 | Branch et al. |
| 2014/0035587 A1 | 2/2014 | Nielsen et al. |
| 2014/0071276 A1 | 3/2014 | Seifer et al. |
| 2014/0201094 A1 | 7/2014 | Herrington et al. |
| 2014/0263644 A1 | 9/2014 | Handshaw et al. |
| 2014/0304654 A1 | 10/2014 | Gross |
| 2015/0012426 A1 | 1/2015 | Purves et al. |
| 2015/0193672 A1 | 7/2015 | King et al. |
| 2015/0248676 A1 | 9/2015 | Vaidyanathan et al. |
| 2015/0269549 A1 * | 9/2015 | Herring ................ G06Q 20/203 705/18 |
| 2015/0302421 A1 | 10/2015 | Caton et al. |
| 2016/0034644 A1 | 2/2016 | Guiney et al. |
| 2016/0042623 A1 | 2/2016 | Riley |
| 2016/0067365 A1 | 3/2016 | Ma et al. |
| 2016/0180467 A1 | 6/2016 | Griffin et al. |
| 2016/0235340 A1 | 8/2016 | Sidar et al. |
| 2016/0267558 A1 | 9/2016 | Bonnell et al. |
| 2017/0061722 A1 | 3/2017 | Malatesta et al. |
| 2017/0091706 A1 | 3/2017 | Lloyd et al. |
| 2017/0109391 A1 | 4/2017 | Rosen et al. |
| 2017/0213184 A1 | 7/2017 | Lee |
| 2017/0236006 A1 | 8/2017 | Davis et al. |
| 2017/0272316 A1 | 9/2017 | Johnson et al. |
| 2018/0107969 A1 | 4/2018 | Tong et al. |
| 2018/0114045 A1 | 4/2018 | Ebrahimi et al. |
| 2018/0173916 A1 | 6/2018 | Endress et al. |
| 2018/0174157 A1 | 6/2018 | Endress et al. |
| 2018/0225749 A1 | 8/2018 | Shoen |
| 2018/0270328 A1 | 9/2018 | Agarwal et al. |
| 2018/0293538 A1 | 10/2018 | Berger et al. |
| 2018/0357596 A1 | 12/2018 | Bedford |
| 2019/0043148 A1 | 2/2019 | Vemury |
| 2019/0045077 A1 | 2/2019 | Irons et al. |
| 2019/0052360 A1 | 2/2019 | Aoyama et al. |
| 2019/0072531 A1 | 3/2019 | DeVries et al. |
| 2019/0158353 A1 | 5/2019 | Johnson et al. |
| 2019/0197466 A1 | 6/2019 | Hand, III et al. |
| 2019/0276181 A1 | 9/2019 | Kelly |
| 2019/0311167 A1 | 10/2019 | Powell et al. |
| 2019/0320988 A1 | 10/2019 | Ahmed et al. |
| 2019/0334730 A1 | 10/2019 | Endress et al. |
| 2019/0348160 A1 | 11/2019 | Heavelyn et al. |
| 2019/0354954 A1 | 11/2019 | Fitzsimmons et al. |
| 2019/0391170 A1 | 12/2019 | Kochar et al. |
| 2020/0096599 A1 * | 3/2020 | Hewett ................ G01S 5/0273 |

* cited by examiner

METHOD TO SYNCHRONIZE A BARCODE DECODE WITH A VIDEO CAMERA TO IMPROVE ACCURACY OF RETAIL POS LOSS PREVENTION

BACKGROUND

Many retailers use video cameras in conjunction with self-checkout stations in order to prevent theft or fraud by users. For instance, video cameras can be helpful in preventing "ticket switching," in which a user attaches a barcode sticker associated with a less expensive item to a more expensive item (e.g., attaching a barcode sticker for an inexpensive cut of meat to a package of more expensive steak). To prevent ticket switching, images captured by the video camera are analyzed to identify the item being purchased, so that the identified item can be compared to information about the item encoded in the barcode.

In order to use a video camera in conjunction with the self-checkout process in this way, it is important to identify when the barcode decode occurs so that the correct frames captured by the video camera can be analyzed to identify the item. Currently self-checkout systems use a microphone to identify when a beep (or other audible indication) associated with the decoding occurs, and attempt to identify the frame at which the decode occurred based on the time that the beep is captured by the microphone. The image captured at the time that the beep is captured by the microphone is then analyzed to identify items at the self-checkout station. However, in many cases, the beep can occur hundreds of milliseconds after the decoding, so the item can be outside of the field of view of the video camera by the time the images captured by the video camera are analyzed.

SUMMARY

In an embodiment, the present invention is a system comprising a video camera configured to capture a set of frames associated with a target object, the set of frames having a first number of frames; a symbology reader configured to: (i) decode a symbology attached to the target object and (ii) generate a signal based on the successful decoding of the symbology attached to the target object; and a processor configured to analyze a sub-set of the set of frames based on the signal, the sub-set of the set of frames having a second number of frames that is smaller than the first number of frames.

In a variation of this embodiment, the set of frames is a first set of frames, wherein the symbology reader is configured to capture a second set of frames associated with the target object, wherein the signal includes an indication of one or more frames of the second set of frames captured at the time of the successful decoding of the symbology attached to the target object, and wherein the processor is further configured to: determine, based on a first start time associated with the first set of frames, a first frame rate associated with the first set of frames, a second start time associated with the second set of frames, and a second frame rate associated with the second set of frames, one or more frames of the first set of frames corresponding to the one or more frames of the second set of frames captured at the time of the decoding of the symbology attached to the target object; and identify the one or more frames of the first set of frames corresponding to the one or more frames of the second set of frames as the sub-set of the first set of frames to be analyzed.

In another embodiment, the present invention is a system comprising: a video camera configured to capture a set of frames associated with a target object, the set of frames having a first number of frames; an electronic scale configured to generate a signal based on measuring a weight associated with the target object that is greater than a threshold weight; and a processor configured to analyze a sub-set of the set of frames based on the signal, the sub-set of the set of frames having a second number of frames that is smaller than the first number of frames.

In a variation of this embodiment, analyzing the sub-set of the set of frames includes analyzing the sub-set of the set of frames to identify the target object captured in the sub-set of frames.

In yet another embodiment, the present invention is a method comprising: capturing, by a video camera, a set of frames associated with a target object, the set of frames having a first number of frames; decoding, by a symbology reader, a symbology attached to the target object; generating, by the symbology reader, a signal based on the successful decoding of the symbology attached to the target object; and analyzing, by a processor, a sub-set of the set of frames based on the signal, the sub-set of the set of frames having a second number of frames that is smaller than the first number of frames.

In a variation of this embodiment, the set of frames is a first set of frames, and the method further comprises: capturing, by the symbology reader, a second set of frames associated with the target object, wherein the signal includes an indication of one or more frames of the second set of frames captured at the time of the successful decoding of the symbology attached to the target object, and determining, by the processor, based on a first start time associated with the first set of frames, a first frame rate associated with the first set of frames, a second start time associated with the second set of frames, and a second frame rate associated with the second set of frames, one or more frames of the first set of frames corresponding to the one or more frames of the second set of frames captured at the time of the decoding of the symbology attached to the target object; and identifying, by the processor, the one or more frames of the first set of frames corresponding to the one or more frames of the second set of frames as the sub-set of the first set of frames to be analyzed.

In still yet another embodiment, the present invention is a method comprising: capturing, by a video camera, a set of frames associated with a target object, the set of frames having a first number of frames; generating, by an electronic scale, a signal based on measuring a weight associated with the target object that is greater than a threshold weight; and analyzing, by a processor, a sub-set of the set of frames based on the signal, the sub-set of the set of frames having a second number of frames that is smaller than the first number of frames.

In a variation of this embodiment, analyzing the sub-set of the set of frames includes analyzing the sub-set of the set of frames to identify the target object captured in the sub-set of frames.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
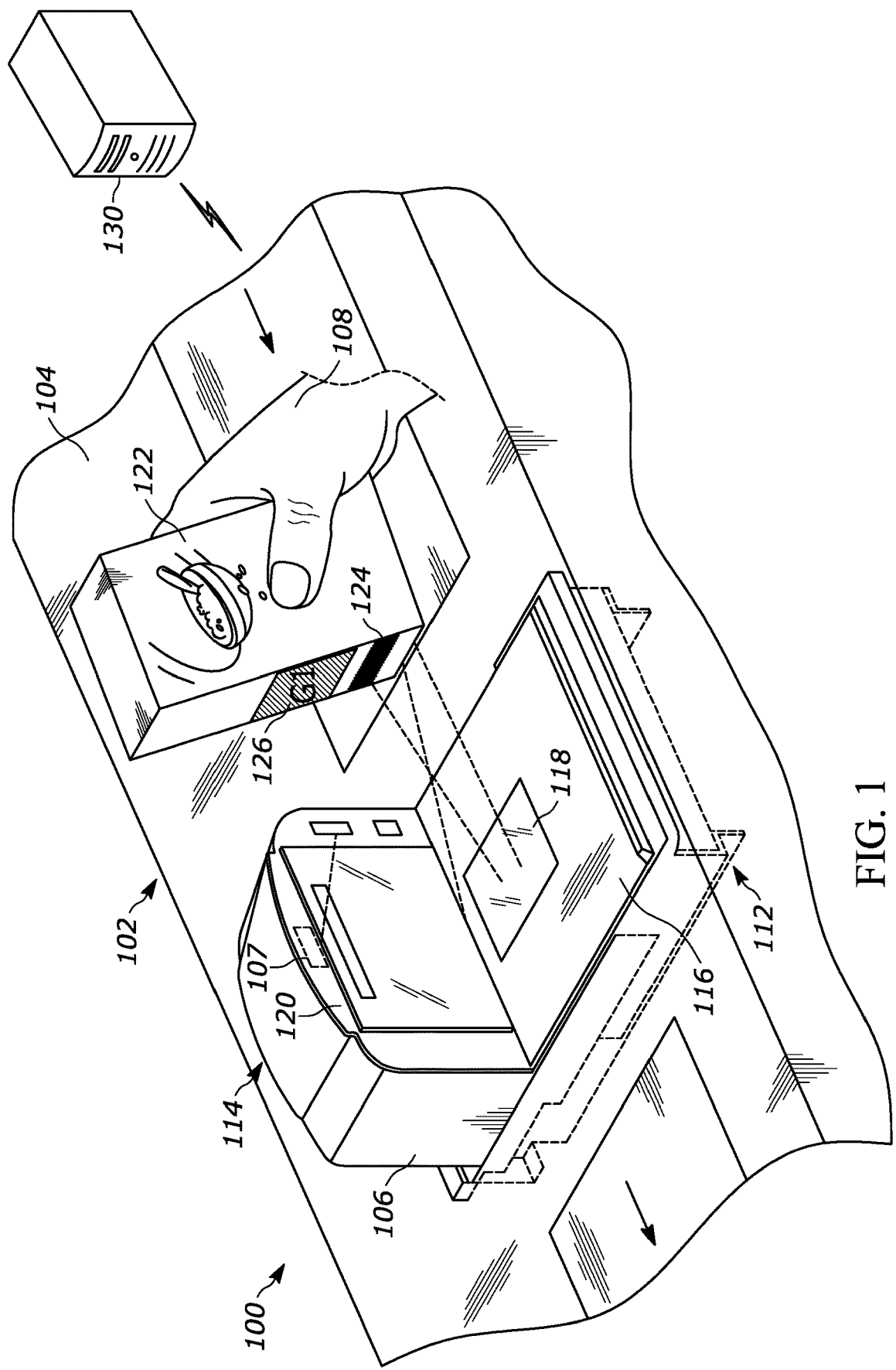
FIG. 1 is a perspective view of an example imaging system, implemented in an example point-of-sale (POS) system, having a bi-optical (also referred to as "bi-optic") imager, showing capture of an image of an object.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

As discussed above, in order to use a video camera in conjunction with the self-checkout process to prevent ticket switching, it is important to identify when barcode decodes occur so that the correct frames captured by the video camera can be analyzed to identify the item whose barcode is being scanned.

The present disclosure provides techniques for synchronizing a barcode decode with a video camera to improve the accuracy of retail POS loss prevention. Generally speaking, a symbology reader (e.g., a barcode reader, or a reader of other indicia) is configured to generate a signal when a successful decode of the symbology occurs. The signal is used to identify a specific frame or image of interest in the video stream. In some examples, the signal includes a timestamp indicating the time at which the decode of the symbology occurred. The timestamp from the symbology reader is then correlated to timestamps associated with each frame of the video stream to identify the frame or image of interest, which is analyzed using image recognition techniques to identify an item being scanned.

However, some symbology readers do not include a real-time clock (RTC), and thus cannot identify a timestamp associated with a decode. In such examples, the symbology reader may identify a frame number at which the decode occurred and generate a signal indicating the frame number. The symbology reader frame number is then correlated to a video camera frame number to identify a video camera frame number as the frame of interest, which is analyzed using image recognition techniques to identify an item being scanned. For example, the symbology reader and the video camera frames may be started at the same time, and known frame rates for the symbology reader and the video camera may be used to "translate" a symbology reader frame to a corresponding video camera frame. For example, if the symbology reader frame rate is 50 Hz and the video camera frame rate is 60 Hz, a decode that occurs on symbology reader frame 50 corresponds to video camera frame 60.

In some examples, similar techniques may be used to identify a video camera frame associated with a weighing event, e.g., when a produce item is placed on a weighing platter (e.g., including an electronic scale) associated with the self-checkout station. That is, video cameras may also be used to speed up the self-checkout process by using image recognition techniques to identify produce items as they are placed on the scale, e.g., so that the user does not need to self-identify each piece of produce being purchased. In such examples, the electronic scale may generate a signal indicating a time (or a particular measurement sample) at which a weight is first measured by the electronic scale, or at a time (or a particular measurement sample) which a stable weight is measured by the electronic scale. Furthermore, in some examples, the electronic scale may generate a signal indicating a measurement sample number at which the weight is first measured by the electronic scale, and the electronic scale measurement sample number may be correlated to a video camera frame number to identify a video camera frame number as the frame of interest, which is analyzed using image recognition techniques to identify an item being weighed. Advantageously, in such examples, the video camera images are only processed starting at the time of the weighing event—as analyzing images when nothing is happening in the video view is non-productive and processor intensive.

FIG. 1 illustrates a perspective view of an example imaging system capable of implementing operations of the example methods described herein, as may be represented by the flowcharts of the drawings that accompany this description. In the illustrated example, an imaging system 100 is in the form of a point-of-sale (POS) system, having a workstation 102 with a counter 104, a bi-optical (also referred to as "bi-optic") symbology reader 106, and an additional camera 107 (e.g., a video camera) at least partially positioned within a housing of the barcode reader 106. In examples herein, the symbology reader 106 is referred to as a barcode reader. Further, in examples herein, the camera 107 may be referred to as an image acquisition assembly and may be implemented as a color camera or other camera configured to obtain images of an object.

Imaging systems herein may include any number of imagers housed in any number of different devices. While FIG. 1 illustrates an example bi-optic barcode reader 106 as the imager, in other examples, the imager may be a handheld device, such as a handheld barcode reader, or a fixed imager, such as barcode reader held in place in a base and operated within what is termed a "presentation mode."

In the illustrated example, the barcode reader 106 includes a lower housing 112 and a raised housing 114. The lower housing 112 may be referred to as a first housing portion and the raised housing 114 may be referred to as a tower or a second housing portion. The lower housing 112 includes a top portion 116 with a first optically transmissive window 118 positioned therein along a generally horizontal plane relative to the overall configuration and placement of the barcode reader 106. In some examples, the top portion 116 may include a removable or a non-removable platter (e.g., a weighing platter including an electronic scale).

In the illustrated example of FIG. 1, the barcode reader 106 captures images of an object, in particular a product 122, such as, e.g., a package or a produce item. In some implementations, the barcode reader 106 captures these images of the product 122 through one of the first and second optically transmissive windows 118, 120. For example, image capture may be done by positioning the product 122 within the fields of view (FOV) of the digital imaging sensor(s) housed inside the barcode reader 106. The barcode reader 106 captures images through these windows 118, 120 such that a barcode 124 associated with the product 122 is digitally read through at least one of the first and second optically transmissive windows 118, 120. In particular, the barcode reader 106 is configured to generate a signal indicating a timestamp and/or frame number associated with a successful decoding of the barcode 124.

In the illustrated example of FIG. 1, additionally, the barcode reader 106 captures images of the product 122 using the camera 107, which generates image data that can be processed, e.g., using image recognition techniques, to identify the product 122 and determine whether the identified product 122 matches the barcode 124, e.g., by determining a first object identification data using image captured of the product 122 and determining a second object identification data using the barcode 124, and comparing the two identification data. In particular, the timestamp and/or frame number associated with the decoding of the barcode 124 attached to the product 122, as indicated by the signal generated by the barcode reader 106 may be used to identify a camera frame number (or a range of camera frame numbers) associated with images associated with the product 122 captured by the camera 107. Accordingly, the identified camera frame numbers may be analyzed to identify the product 122.

In the illustrated example of FIG. 1, the imaging system 100 includes a server 130 communicatively coupled to the barcode reader 106 through a wired or wireless communication link. In some examples, the server 130 is a remote server, while in other examples, the server 130 is a local server. The server 130 is communicatively coupled to a plurality of imaging systems 100 positioned at checkout area of a facility, for example. In some examples, the server 130 is implemented as an inventory management server that generates and compares object identification data. In some examples, the server 130 is accessible by a manager for monitoring operation and improper product scanning by the imaging system 100.

Figure 2:
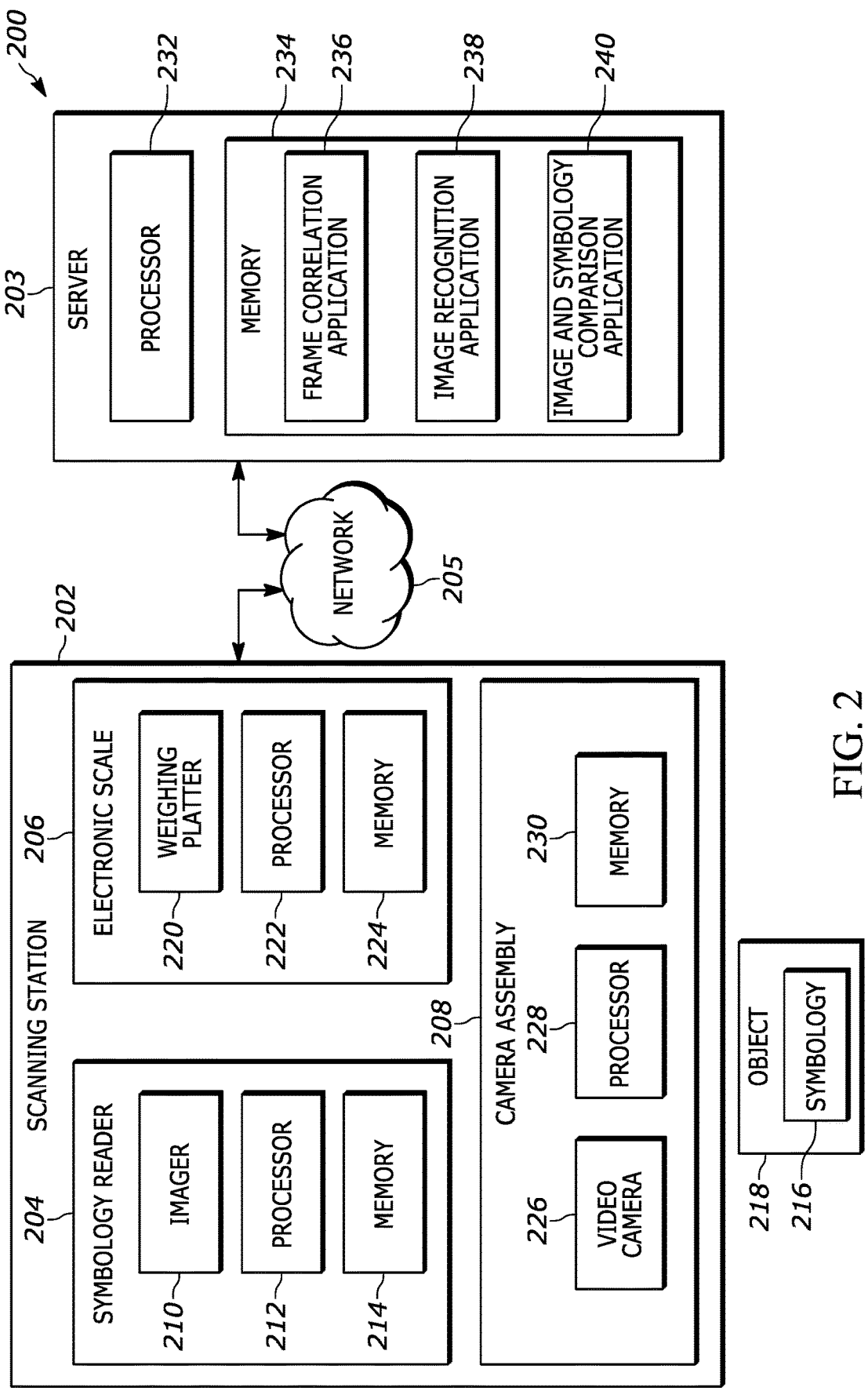
FIG. 2 illustrates a block diagram of an example logic circuit for implementing example methods and/or operations described herein including techniques for synchronizing a barcode reader with a video camera to improve accuracy of retail POS loss prevention.

FIG. 2 illustrates an example system where embodiments of the present invention may be implemented. In the present example, the environment is provided in the form of a facility having one or more scanning locations 200 corresponding to an imaging system, such as the imaging system 100 of FIG. 1, where various goods may be scanned for completing a purchase of an object.

In the illustrated example, the location 200 is a point of sale location and includes a scanning station 202 and a server 203, which may communicate via a network 205 (and/or via a wired interface, not shown). In some embodiments, the device referred to as "server 203" may be a single board computer (SBC) 203. The server 203 may be local to the scanning station 202, or may even be part of the scanning station 202 in some embodiments. In other embodiments, the server 203 may be located remotely from the scanning station 202. The scanning station 202 may include a network interface (not shown) that represents any suitable type of communication interface(s) (e.g., wired interfaces such as Ethernet or USB, and/or any suitable wireless interfaces) configured to operate in accordance with any suitable protocol(s) for communicating with the server 203 over the network 205.

The scanning station 202 may include a symbology reader 204 and/or an electronic scale 206, as well as a camera assembly 208. For example, the symbolopgy reader 204, electronic scale 206, and/or the camera assembly 208 may be included within a bioptic housing. The symbology reader 204 may be a scanner, such as a barcode scanner, or any type of symbology reader, such as, e.g., an RFID tag reader. The symbology reader 204 may include an imager 210, as well as one or more processors 212, which may be, for example, one or more microprocessors, controllers, and/or any suitable type of processors, and a memory 214 accessible by the processor 212 (e.g., via a memory controller). The imager 210, which may be a camera or other suitable black-and-white or color image sensor, may be configured to capture images of a symbology 216 attached to or otherwise associated with an object 218 (e.g., an item to be purchased at the scanning station 202). The example processor 212 may interact with the memory 214 to obtain, for example, machine-readable instructions stored in the memory 214 corresponding to, for example, the operations represented by the flowcharts of this disclosure, including those of FIGS. 3 and 4. In particular, the instructions stored in the memory 214, when executed by the processor 212, may cause the processor 212 to analyze images of the symbology 216 to decode the symbology 216. Furthermore, the instructions stored in the memory 214, when executed by the processor 212, may cause the processor 212 to generate a signal (e.g., to be transmitted to the server 203) associated with a successful decoding of the symbology 216. The signal may include an indication of information associated with the decoded symbology 216, as well as an indication of a timestamp or a frame number associated with the successful decoding of the symbology 216. Additionally or alternatively, machine-readable instructions corresponding to the example operations described herein may be stored on one or more removable media (e.g., a compact disc, a digital versatile disc, removable flash memory, etc.) that may be coupled to the symbology reader 204 to provide access to the machine-readable instructions stored thereon.

The electronic scale 206 may include a weighing platter 220, as well as one or more processors 222, which may be, for example, one or more microprocessors, controllers, and/or any suitable type of processors, and a memory 224 accessible by the processor 222 (e.g., via a memory controller). The weighting platter 220 may be configured to measure a weight associated with the target object 218. The example processor 222 may interact with the memory 224 to obtain, for example, machine-readable instructions stored in the memory 224 corresponding to, for example, the operations represented by the flowcharts of this disclosure, including those of FIGS. 3 and 4. In particular, the instructions stored in the memory 224, when executed by the processor 222, may cause the processor 222 to generate a signal (e.g., to be transmitted to the server 203) associated with the weighing platter 220 measuring a stable or otherwise non-zero weight associated with the target object 218. The signal may include an indication of the measured weight of the target object 218, as well as a time stamp or a measurement sample number associated with the measurement of the stable or otherwise non-zero weight associated with the target object 218. Additionally or alternatively, machine-readable instructions corresponding to the example operations described herein may be stored on one or more removable media (e.g., a compact disc, a digital versatile disc, removable flash memory, etc.) that may be coupled to the electronic scale 206 to provide access to the machine-readable instructions stored thereon.

The camera assembly 208 may include a camera 226, as well as one or more processors 228, which may be, for example, one or more microprocessors, controllers, and/or any suitable type of processors, and a memory 230 accessible by the one or more processors 228 (e.g., via a memory controller). The camera 226, which may be a video camera, may be configured to capture video images associated with the target object 218. The example processor 228 may interact with the memory 230 to obtain, for example, machine-readable instructions stored in the memory 230 corresponding to, for example, the operations represented by the flowcharts of this disclosure, including those of FIGS. 3 and 4. In particular, the instructions stored in the memory 230, when executed by the processor 228, may cause the processor 228 to generate a signal (e.g., to be transmitted to the server 203). The signal may include images captured by the camera 226 as well as an indication of a time stamp or a frame number associated with each image captured by the camera 226. Additionally or alternatively, machine-readable instructions corresponding to the example operations described herein may be stored on one or more removable media (e.g., a compact disc, a digital versatile disc, removable flash memory, etc.) that may be coupled to the camera assembly 208 to provide access to the machine-readable instructions stored thereon.

The server 203 may include one or more processors 232, which may be, for example, one or more microprocessors, controllers, and/or any suitable type of processors, and a memory 234 accessible by the one or more processors 232 (e.g., via a memory controller). An example processor 232 may interact with the memory 234 to obtain, for example, machine-readable instructions stored in the memory 234 corresponding to, for example, the operations represented by the flowcharts of this disclosure, including those of FIGS. 3 and 4. In particular, the instructions stored in the memory 234, when executed by the processor 232, may cause the processor 232 to receive and analyze signals generated by the symbology reader 204 and/or electronic scale 206, as well as signals generated by the camera assembly 208. For example, the memory 234 may include a frame correlation application 236, an image recognition application 238, and/or an image and symbology comparison application 240. The frame correlation application 236 may be configured to correlate frames captured by the video camera 226 to frames or timestamps associated with the symbology reader 204's successful decoding of the symbology 216 and/or measurement sample numbers or timestamps associated with the electronic scale's measurement of a non-zero or stable weight of the object 218 to identify frames captured by the video camera 226 to be analyzed, as discussed in greater detail below with respect to the discussion of FIGS. 3 and 4. Additionally, the image recognition application 238 may be configured to analyze the video camera frames identified by the frame correlation application 236 in order to identify objects shown in images captured by the video camera at the identified frames. Furthermore, the symbology comparison application 240 may be configured to compare the object 218 as identified by the image recognition application 238 to information decoded from the symbology reader 204 at correlated frames to determine whether the identified object 218 matches the information encoded in the symbology 216 with which it is associated, e.g., to identify instances of ticket switching.

In some examples, the applications 236, 238, and 240 may be combined as a single application. Furthermore, additional or alternative applications may be included in various embodiments. Moreover, in some embodiments, applications or operations described herein as being performed by the processor 232 may be performed by the processors 212, 222, or 228, and vice versa. Additionally or alternatively, machine-readable instructions corresponding to the example operations described herein may be stored on one or more removable media (e.g., a compact disc, a digital versatile disc, removable flash memory, etc.) that may be coupled to the server 203 to provide access to the machine-readable instructions stored thereon.

Figure 3:
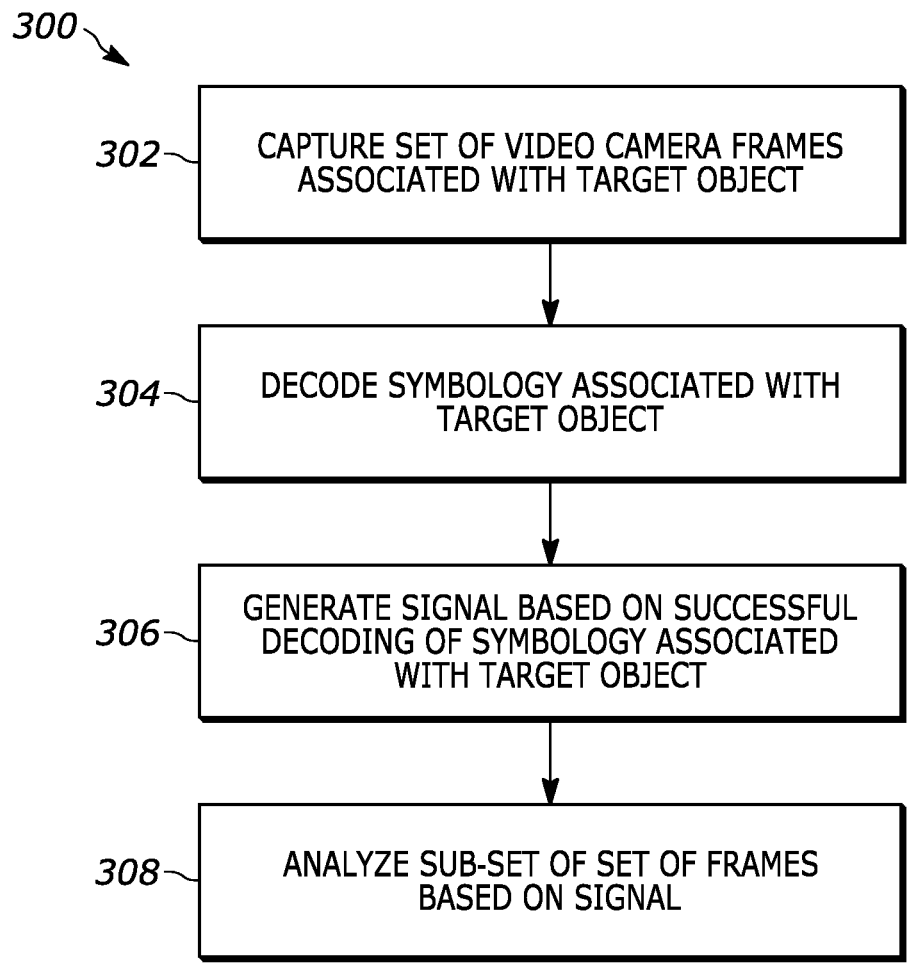
FIG. 3 illustrates a block diagram of an example process as may be implemented by the logic circuit of FIG. 2, for implementing example methods and/or operations described herein including techniques for synchronizing a barcode reader with a video camera to improve accuracy of retail POS loss prevention.

FIG. 3 illustrates a block diagram of an example process 300 as may be implemented by the logic circuit of FIG. 2, for implementing example methods and/or operations described herein including techniques for synchronizing a barcode reader with a video camera to improve accuracy of retail POS loss prevention, as may be performed by the imaging system 100 and server 130 in FIG. 1 or by the scanning station 202 and server 203 in FIG. 2.

At a process 302, a camera (e.g., a video camera) may capture a set of image frames associated with a target object (e.g., an item being scanned at a self-checkout station). In particular, the set of frames may have a particular number of frames (e.g., 100 frames, 1000 frames, etc.).

At a process 304, a symbology (e.g., a barcode or other indicium) attached to the target object may be decoded by a symbology reader. In some examples, the symbology reader may record a timestamp associated with the successful decoding of the symbology attached to the target object (e.g., an indication that the symbology attached to the target object was decoded at 2:31:06 PM Eastern Time on Dec. 1, 2019). In some examples, the symbology reader may capture a series of frames associated with the decoding of the target object, and may record an indication of one or more frames captured at the time of a successful decoding of the symbology attached to the target object. For instance, in some examples, the series of frames captured by the symbology reader may have the same start time as the series of frames captured by the camera at the process 302 (or substantially the same start time, e.g., within 1 microsecond, or within 5 microseconds of the frames captured by the camera). In some examples, the series of frames captured by the symbology reader may have a known start time that is different from the start time of the series of frames captured by the camera at the process 302, or that is offset from the start time of the series of frames captured by the camera at the process 302 by a known interval of time.

At a process 306, the symbology reader may generate a signal based on the successful decoding of the symbology attached to the target object. For instance, in some examples the signal may include an indication of the timestamp associated with the successful decoding of the symbology attached to the target object. Furthermore, in some examples, the signal may include an indication of the one or more frames captured at the time of the successful decoding of the symbology attached to the target object.

At a process 308, a processor may analyze a sub-set of the set of frames captured by the camera based on the signal. For instance, analyzing the sub-set of the set of frames may include analyzing the sub-set of the set of frames to identify the target object captured in the sub-set of frames, e.g., using computer-implemented image recognition techniques. For example, the processor may compare the identified target object to data based on the decoding of the symbology attached to the target object to identify a discrepancy between the identified target object and data based on the decoding of the symbology attached to the target object, e.g., indicating a potential instance of ticket switching by a user of the self-checkout station.

In particular, the sub-set of frames may have a number of frames that is smaller than the number of frames in the set of frames. For instance, if the set of frames has 1000 frames, the sub-set of frames may have 10 frames, or some other number of frames smaller than 1000.

In some examples, the processor may identify the sub-set of the set of frames captured by the camera based on the timestamp associated with the successful decoding of the symbology attached to the target object. That is, the processor may identify a sub-set of frames that were captured at or near the time that the symbology attached to the target object was decoded. For example, if the symbology attached to the target object was decoded at 2:31:06 PM, the sub-set of frames to be analyzed could include video camera frames captured from 2:31:01 PM to 2:31:11 PM, or video camera frames captured from 2:30:56 to 2:31:16 PM, or any other suitable range of frames captured at or near the time of the decoding of the target object.

Furthermore, in some examples, the processor may identify the sub-set of the set of frames captured by the camera based on the frames captured by the symbology reader at the time of the decoding of the symbology attached to the target object. That is, the processor may identify a sub-set of frames that were captured at or near the frame associated with the decoding of the symbology attached to the target object using the frame rate of the frames captured by the video camera, the frame rate of the frames captured by the symbology reader, and the start times for each of the video camera and the symbology reader's frames. For instance, the symbology reader may successfully decode the symbology attached to the target object at frame 50. If the symbology reader has a frame rate of 50 Hz and the camera has a frame rate of 60 Hz, and if the symbology reader and the camera's frames start at the same time, the camera's frame 60 will correspond to the symbology reader's frame 50. Accordingly, in this example, the sub-set of frames to be analyzed could include the camera's frame 60, or a range of camera frames (e.g., frames 55 to 65, frames 50 to 70, or some other suitable range of frames).

Figure 4:
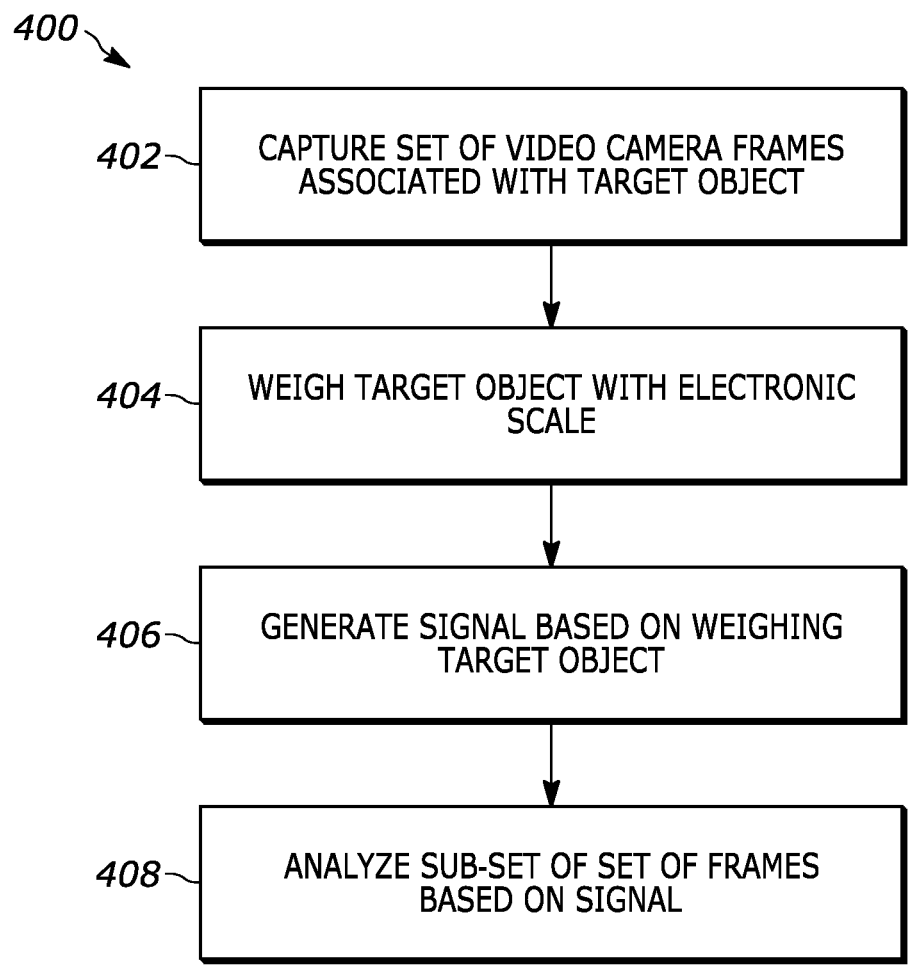
FIG. 4 illustrates a block diagram of another example process as may be implemented by the logic circuit of FIG. 2, for implementing example methods and/or operations described herein including techniques for synchronizing an electronic scale with a video camera to improve accuracy of image recognition for produce items as they are weighed by a user.

FIG. 4 illustrates a block diagram of another example process 400 as may be implemented by the logic circuit of FIG. 2, for implementing example methods and/or operations described herein including techniques for synchronizing an electronic scale with a video camera to improve accuracy of image recognition for produce items as they are weighed by a user, as may be performed by the imaging system 100 and server 130 in FIG. 1 or by the scanning station 202 and server 203 in FIG. 2.

At a process 402, a camera (e.g., a video camera) may capture a set of image frames associated with a target object (e.g., a produce item being purchased at a self-checkout station). In particular, the set of frames may have a particular number of frames (e.g., 100 frames, 1000 frames, etc.).

At a process 404, the target object may be weighed by an electronic scale (e.g., an electronic scale that is part of a weighing platter).

At a process 406, the electronic scale may generate a signal based on measuring a weight associated with the target object that is greater than a threshold weight (e.g., a non-zero weight) and/or that is a stable weight (e.g., not fluctuating over the course of a threshold period of time). In some examples, the signal may include a timestamp recorded by the electronic scale at the time of measuring a weight associated with the target object that is a non-zero weight or that is a stable weight (e.g., an indication that the non-zero weight or stable weight was measured at 2:31:06 PM Eastern Time on Dec. 1, 2019). In some examples, the electronic scale may rely on an analog-to-digital converter that gets "sampled" at a particular rate to get digital values corresponding to analog signal for the physical weight measured by the electronic scale, and the signal may include an indication, recorded by the electronic scale, of particular measurement samples captured at the time of measuring the stable weight or non-zero weight associated with the target object. For instance, in some examples, the series of measurement samples captured by the electronic scale may have the same start time as the series of frames captured by the camera at the process 402 (or substantially the same start time, e.g., within 1 microsecond, or within 5 microseconds of the frames captured by the camera). In some examples, the series of measurement samples captured by the electronic scale may have a known start time that is different from the start time of the series of frames captured by the camera at the process 302, or that is offset from the start time of the series of frames captured by the camera at the process 302 by a known interval of time.

At a process 408, a processor may analyze a sub-set of the set of frames captured by the camera based on the signal. In particular, the sub-set of frames may have a number of frames that is smaller than the number of frames in the set of frames. For instance, if the set of frames has 1000 frames, the sub-set of frames may have 10 frames, or some other number of frames smaller than 1000. For instance, analyzing the sub-set of the set of frames may include analyzing the sub-set of the set of frames to identify the target object captured in the sub-set of frames, e.g., using computer-implemented image recognition techniques.

In some examples, the processor may identify the sub-set of the set of frames captured by the camera based on the timestamp associated with measuring a weight associated with the target object that is a non-zero weight or that is a stable weight. That is, the processor may identify a sub-set of frames that were captured at or near the time that the non-zero weight or stable weight associated with the target object was measured by the electronic scale. For example, if the non-zero weight or stable weight associated with the target object was measured at 2:31:06 PM, the sub-set of frames to be analyzed could include video camera frames captured from 2:31:01 PM to 2:31:11 PM, or video camera frames captured from 2:30:56 to 2:31:16 PM, or any other suitable range of frames captured at or near the time of the electronic scale measuring the non-zero or stable weight associated with the target object.

Furthermore, in some examples, the processor may identify the sub-set of the set of frames captured by the camera based on the particular measurement samples captured by the electronic scale at the time of measuring the non-zero weight or stable weight associated with the target object. That is, the processor may identify a sub-set of frames that were captured at or near the time of the measurement sample associated with the electronic scale measuring the non-zero or stable weight associated with the target object using the frame rate of the frames captured by the video camera, the sample rate of the measurement samples captured by the electronic scale, and the start times for the video camera's frames and the electronic scale's measurement samples. For instance, the electronic scale may measure a non-zero or stable weight associated with the target object at sample 50. If the electronic scale has a sample rate of 50 Hz and the camera has a frame rate of 60 Hz, and if the electronic scale's samples and the camera's frames start at the same time, the camera's frame 60 will correspond to the electronic scale's sample 50. Accordingly, in this example, the sub-set of frames to be analyzed could include the camera's frame 60, or a range of camera frames (e.g., frames 55 to 65, frames 50 to 70, or some other suitable range of frames).

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A system, comprising:
    a video camera configured to capture a set of frames associated with a target object, the set of frames having a first number of frames;
    an electronic scale configured to generate a signal based on measuring a weight associated with the target object that is greater than a threshold weight; and
    a processor configured to analyze a sub-set of the set of frames based on the signal, the sub-set of the set of frames having a second number of frames that is smaller than the first number of frames,
    wherein the signal includes an indication of a timestamp associated with measuring the weight associated with the target object that is greater than the threshold weight, and wherein the processor is configured to identify the sub-set of the set of frames based on the timestamp.

2. The system of claim 1, wherein analyzing the sub-set of the set of frames includes analyzing the sub-set of the set of frames to identify the target object captured in the sub-set of frames.

3. The system of claim 1, wherein measuring the weight includes measuring a stable weight.

4. A method, comprising:
    capturing, by a video camera, a set of frames associated with a target object, the set of frames having a first number of frames;
    generating, by an electronic scale, a signal based on measuring a weight associated with the target object that is greater than a threshold weight; and
    analyzing, by a processor, a sub-set of the set of frames based on the signal, the sub-set of the set of frames having a second number of frames that is smaller than the first number of frames,
    wherein the signal includes an indication of a timestamp associated with measuring the weight associated with the target object that is greater than the threshold weight, and the method further comprising identifying, by the processor, the sub-set of the set of frames based on the timestamp.

5. The method of claim 4, wherein analyzing the sub-set of the set of frames includes analyzing the sub-set of the set of frames to identify the target object captured in the sub-set of frames.

6. The method of claim 4, wherein measuring the weight includes measuring a stable weight.

* * * * *